No. 819,377. PATENTED MAY 1, 1906.
W. C. PRICE.
DRIVING MECHANISM FOR AUTOMOBILES.
APPLICATION FILED JULY 8, 1905.
3 SHEETS—SHEET 1.
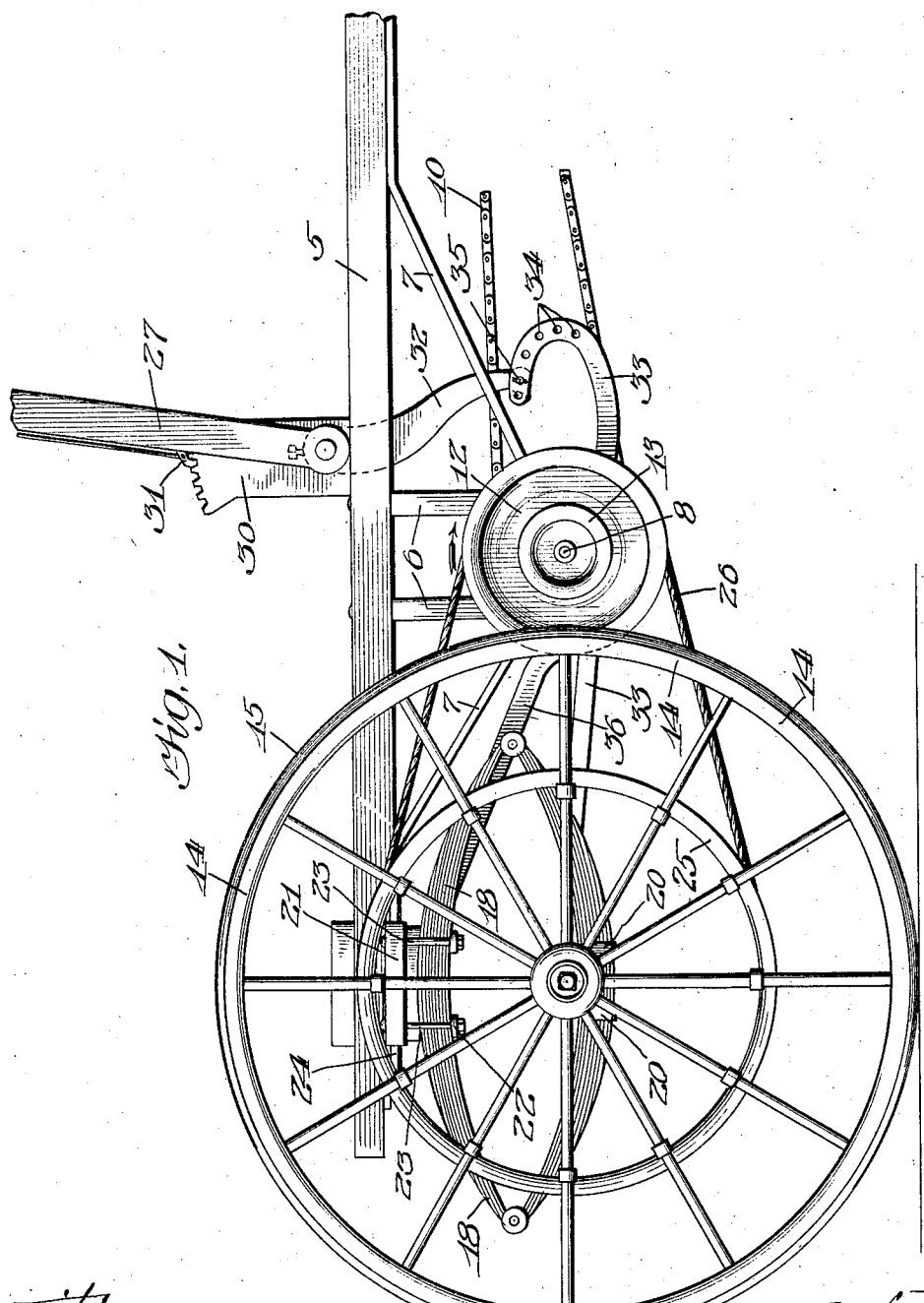

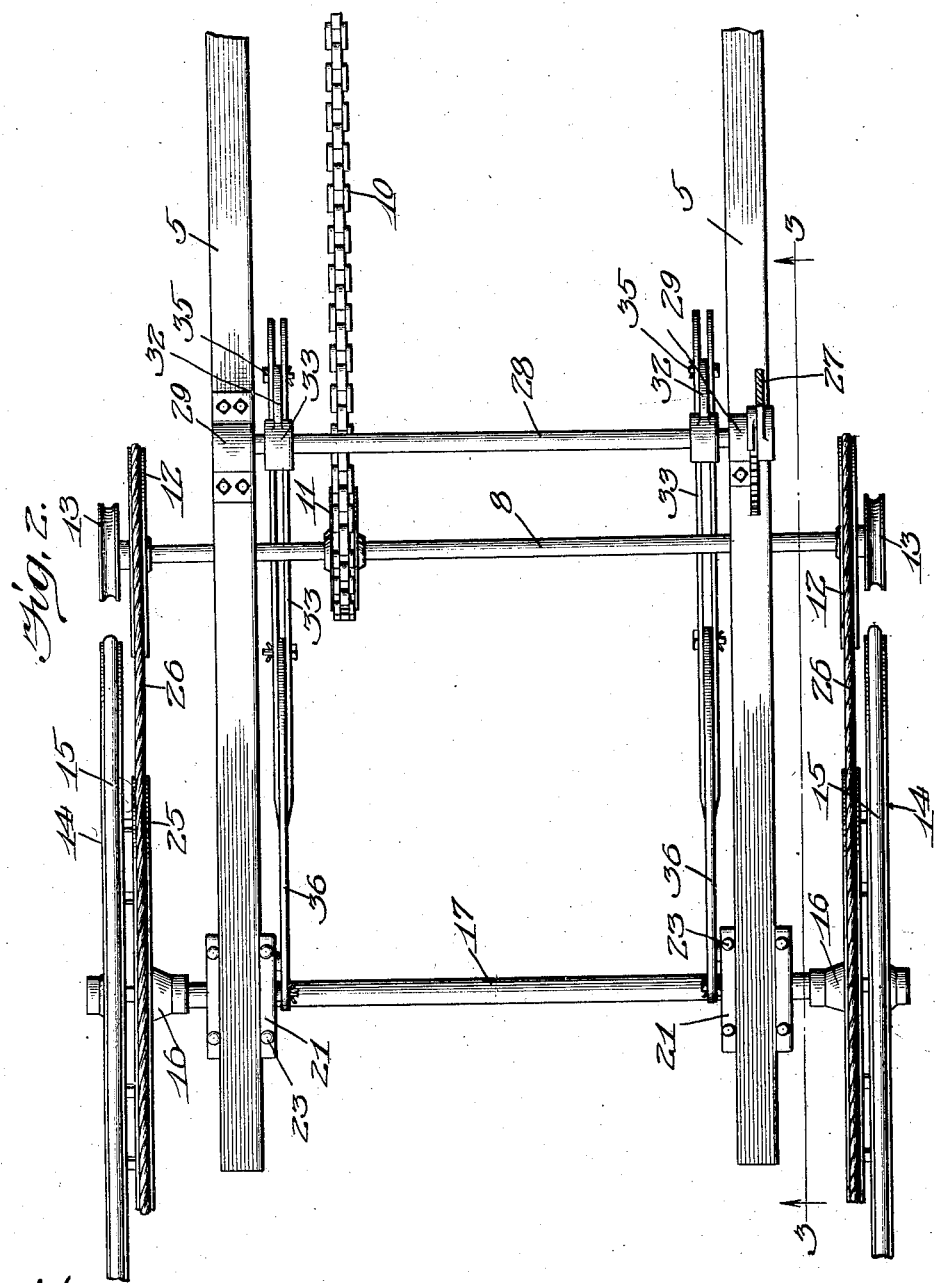

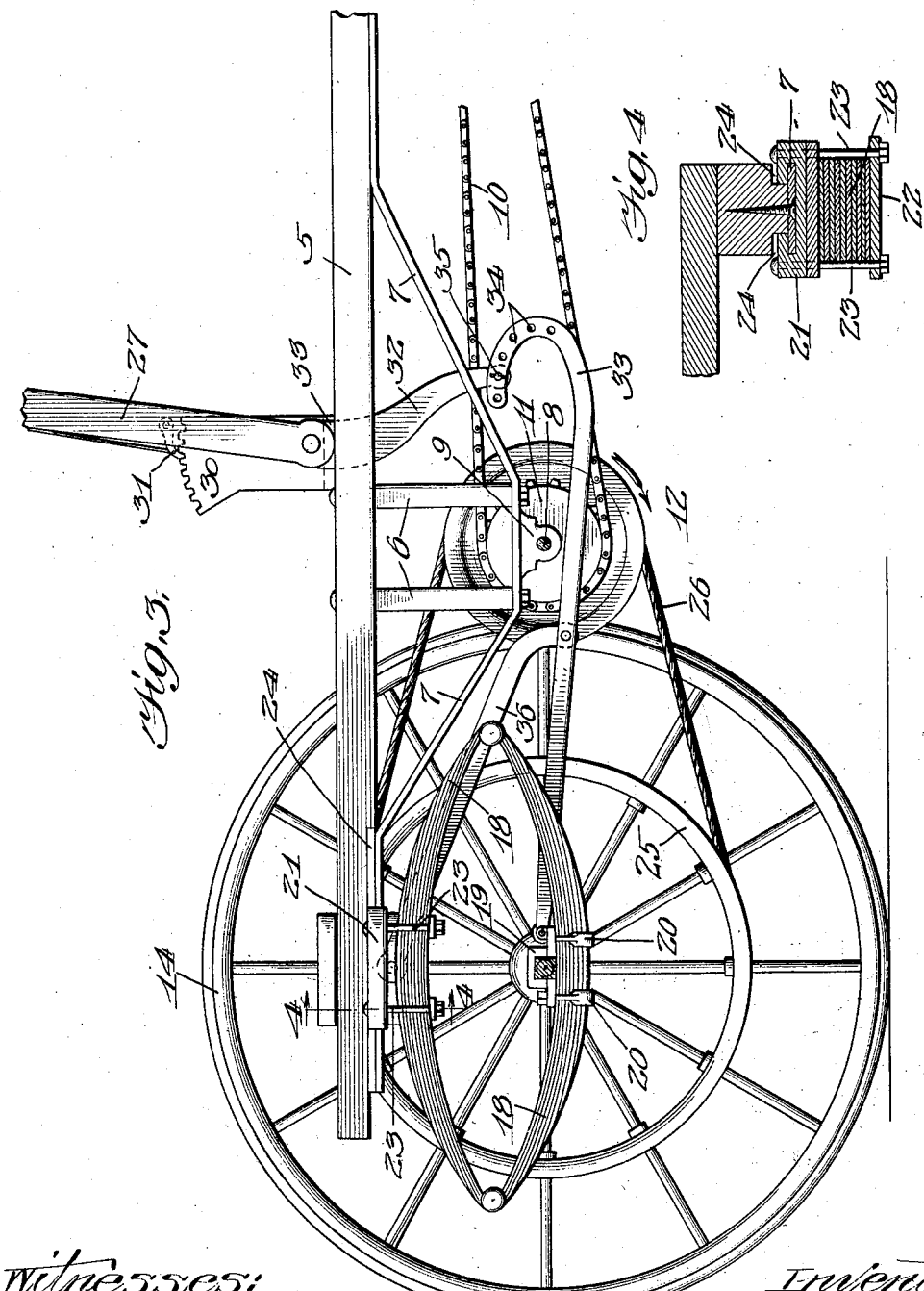

UNITED STATES PATENT OFFICE.

WILLIAM C. PRICE, OF CHICAGO, ILLINOIS, ASSIGNOR TO STAVER CARRIAGE COMPANY, OF CHICAGO, ILLINOIS, A CORPORATION OF ILLINOIS.

DRIVING MECHANISM FOR AUTOMOBILES.

No. 819,377.     Specification of Letters Patent.     Patented May 1, 1906.

Application filed July 8, 1905. Serial No. 268,880.

*To all whom it may concern:*

Be it known that I, WILLIAM C. PRICE, a citizen of the United States, residing at Chicago, in the county of Cook, State of Illinois, have invented certain new and useful Improvements in Driving Mechanism for Automobiles, of which the following is a full and complete specification, reference being had to the accompanying drawings.

My invention relates to driving mechanism for automobiles; and its object is to provide new and improved mechanism by which the driving-wheels of an automobile or other vehicle propelled by power carried by itself may be driven, by which the power may be disconnected from the driving-wheels, and by which the driving-wheels may be reversed by a simple and easily-operated mechanism.

In the drawings, Figure 1 is a side elevation of my mechanism, showing the driving-wheel and part of the frame of the vehicle. Fig. 2 is a top or plan view. Fig. 3 is a side elevation with the near wheels and driving-pulley removed in order to show the parts behind. Fig. 4 is an enlarged detail, being section on line 4 4 of Fig. 3.

Referring to the drawings, 5 indicates the side bars of the frame of the vehicle.

6 indicates hangers supported by brace 7 from the side bars of the frame.

8 indicates a shaft mounted in suitable journals 9, secured to the hangers 6. The shaft is driven by any suitable prime mover and in any suitable manner, as by sprocket-chain 10 and sprocket-wheel 11. The prime mover, as has been said, may be of any kind and construction, and as neither it nor the forward frame and wheels of the vehicle form any portion of my present invention they are not shown.

12 indicates pulleys which are secured to the shaft 8 upon each side of the frame 5 and rotate in the direction indicated by arrows when the shaft 8 is driven by the prime mover.

13 indicates friction-pulleys which are keyed or otherwise secured upon the opposite ends of the shaft 8 outside the pulleys 12.

14 indicates driving-wheels provided with the usual tires 15 and hubs 16. The hubs 16 are journaled upon an axle 17, which is secured to the springs 18 and supported thereon by suitable devices, such as saddles 19 and bolts 20.

21 indicates slide-boxes which are secured to the upper half of the springs 18 by cross-bars 22 and bolts 23, as is best shown in Fig. 4.

As is best shown in Fig. 4, the side bars 5 of the frame are rabbeted out upon each side at their lower edge near their rear, so as to form, with the rear end of the braces 7, slots 24, whereby the lower portions of the side bars 5 at the rabbeted-out portions and the rear end of the bar 7 are embraced within the slide-boxes 21, so that the slide-boxes may slide thereon longitudinally of the side bars.

It will be seen from the above description that the rear ends of the side bars 5 are supported in the slide-boxes 21, which are in turn supported on the springs upon which the axle 17 is secured, and which in turn is supported by the driving-wheels 14.

25 indicates driving-pulleys which are secured to the inner surfaces of the wheels 14 in alinement with the pulleys 12.

26 indicates ropes or driving-belts which pass around the pulleys 12 and the pulleys 25.

27 indicates a hand-lever which is secured to one end of a rock-shaft 28, which is journaled in suitable bearings 29 on the side bars 5 and which is provided with the usual rack-bar 30 and dog 31.

32 indicates rock-arms depending downwardly from and secured to the rock-shaft 28.

33 indicates links which are pivotally connected with the lower ends of the rock-arms 32 and extending backward to the rear are pivotally connected with the saddles 19 upon the axle 17. The forward end of the links 33 are provided with a series of openings 34, by means of which the connection with the rock-arms 32 may be adjusted by means of suitable pins 35 passing through said openings and through suitable openings in the lower ends of the rock-arms 32.

36 indicates links which are pivotally connected at their forward ends with the links 33 at a point between the forward and rear ends of said links 33 and are pivotally connected at their upper ends with the slide-boxes 21.

From the above description it will be seen that when the hand-lever 27 is thrown forward the rock-arms 32 will be moved backward, and by means of the links 33 36 the slide-boxes 21 and driving-wheels will be moved backward, so as to tighten the driving-ropes 26, thus causing the wheels to be rotated in the same direction in which the shaft 8 is rotated by the prime mover and causing the vehicle to be driven forward. It will be readily understood, of course, that the driving-ropes may be thus tightened as much as be desired and the hand-lever locked in any desired position. When it is desired to disconnect the driving mechanism, the hand-lever 27 is pulled backward, which will throw the rock-arms 33 forward, moving the slide-boxes 21 and driving-wheels 14 forward relatively to the frame 5, thus loosening the driving-ropes and preventing the driving-wheels from being rotated with the rotation of the shaft 8. A still farther backward motion of the hand-lever will move the driving-wheels and slide-boxes still farther forward relatively to the side bars 5 until the friction-pulleys 13 bear upon the peripheries of the wheels 14, which will cause the rotation of the driving-wheels to be reversed and the machine to be backed. It will be seen from the above description that by the movement of a single lever easily under the control of the driver the machine may be started forward and by varying the tension upon the driving-ropes the forward speed regulated, by which means the machine may be gradually started and, as the rope is tightened, urged forward at its full speed. It will also be obvious that by the manipulation of the same lever in the other direction easily under the control of the driver the driving-pulley may be disconnected from the driving-wheels, the machine braked as may be desired, according to the amount of pressure exerted between the friction-pulley 13 and the periphery of the driving-wheel and then backed, if desired. The hand-lever, as has been said, may be locked at any desired position by means of the rack-bar 30 and dog 31. It will of course be understood from the above description that the hand-lever 27 will be in its intermediate position when the machine is not being driven, and that in starting the machine the lever is moved forward to such a position that the driving-rope is not tightened to the extreme at first and will slip upon the pulleys, so that the machine will not be started too violently, and that as the machine moves forward the pressure of the driving-ropes upon the pulleys may be increased by the farther forward motion of the lever until the maximum speed is reached. It will also be obvious that any required degree of braking may be applied by varying the amount of pressure upon the pulleys 13 and the peripheries of wheels 14 until when the pressure is still stronger the driving-wheels are reversed by the action of the pulleys upon the peripheries of the wheels.

It will be readily understood from the above description that one of the advantages of my invention is that I am enabled to control the speed of the automobile without the use of gears for increasing or diminishing the speed, for not only can the machine be started slowly and the speed gradually increased to its limit by the gradual tightening of the belt by the moving of the hand-lever, but by throwing the hand-lever only a part of the distance over the driving-belt will not be tightened to the full extent, and hence will slip upon the driving-pulleys to a certain extent, depending upon the degree to which the belts are tightened, and thus a speed less than the full speed may be maintained. It will also be obvious that by means of my invention I am enabled to do away with the differential gearing upon the driving-shaft, for when turning a corner the belt upon the inner side of the curve will slip upon the pulleys, and thus allow for the difference in speed required.

I have shown my mechanism in the drawings and described it in the specification as being so constructed as to throw the driving-wheels backward with reference to the frame so as to urge the machine forward by the forward motion of the lever and the reverse by the backward motion of the lever. It will of course be apparent that by obvious mechanical shifts in the rock-shaft and its connections the backward motion of the lever might be used when it was desired to start the machine, and the forward motion when it was desired to stop or back the machine, and I therefore do not confine myself to the precise motions of the hand-lever as shown and described.

What I claim as new, and desire to secure by Letters Patent, is—

1. In a self-propelled vehicle, the combination with a frame, slide-boxes mounted on said frame, springs secured to said slide-boxes, an axle secured to said springs, driving-wheels mounted upon said axle, and driving-pulleys rigidly connected with said driving-wheels, of a driving-shaft, driving-pulleys secured to said driving-shaft, driving-belts connecting the driving-pulleys on said driving-shaft with the driving-pulleys on said driving-wheels, friction-pulleys secured to said driving-shaft in alinement with said wheels, a lever mounted on said frame, and connections between said lever and said slide-boxes and axles, whereby when said lever is moved in one direction the said driving-belts will be tightened and when said lever is moved in the other direction said driving-belts will be slackened and said driving-wheels moved into frictional engagement with said friction-pulleys.

2. In a self-propelled vehicle, the combination with a frame, slide-bearings carried thereby and movable longitudinally thereof, an axle connected with said slide-bearings, driving-wheels on said axle, and driving-pulleys connected with said driving-wheels, of a driving-shaft journaled in said frame, driving-pulleys on said driving-shaft, belts connecting the driving-pulleys on said driving-shaft with those connected with the driving-wheels, a lever mounted on said frame, and connections between said lever and said axle and slide-bearings.

3. In a self-propelled vehicle, the combination with a frame, slide-bearings carried thereby and movable longitudinally thereof, springs secured to said slide-bearings, an axle secured to said springs, driving-wheels on said axle, and driving-pulleys connected with said driving-wheels, of a driving-shaft journaled in said frame, driving-pulleys on said driving-shaft, belts connecting the driving-pulleys on said driving-shaft with those connected with the driving-wheels, a lever mounted on said frame, and connections between said lever and said axle and slide-bearings.

WILLIAM C. PRICE.

Witnesses:
C. E. PICKARD,
W. H. DE BUSK.